(12) United States Patent
Priest

(10) Patent No.: US 9,347,451 B2
(45) Date of Patent: May 24, 2016

(54) LIVESTOCK BUILDING DESIGN

(75) Inventor: John Brian Priest, Dubuque, IA (US)

(73) Assignee: DDI, Inc., Dubuque, IA (US)

( * ) Notice: Subject to any disclaimer, the term of this patent is extended or adjusted under 35 U.S.C. 154(b) by 936 days.

(21) Appl. No.: 13/216,206

(22) Filed: Aug. 23, 2011

(65) Prior Publication Data

US 2013/0052935 A1 Feb. 28, 2013

(51) Int. Cl.
F24F 7/007 (2006.01)
F04D 25/16 (2006.01)
A01K 1/00 (2006.01)
F24F 11/00 (2006.01)

(52) U.S. Cl.
CPC ............ F04D 25/166 (2013.01); A01K 1/0047 (2013.01); F24F 11/0001 (2013.01)

(58) Field of Classification Search
CPC .. A01K 1/0047; F04D 25/166; F24F 11/0001
USPC .............................. 454/338; 703/2
See application file for complete search history.

(56) References Cited

U.S. PATENT DOCUMENTS

| | | | | |
|---|---|---|---|---|
| 2,949,027 A * | 8/1960 | Eolkin | .......................... | 73/32 R |
| 4,051,999 A * | 10/1977 | Granger et al. | ............... | 126/591 |
| 4,182,401 A * | 1/1980 | Pinnell et al. | .................. | 165/210 |
| 4,369,030 A * | 1/1983 | Siccardi | .......................... | 432/37 |
| 4,609,346 A * | 9/1986 | Siccardi | .......................... | 432/222 |
| 4,798,518 A * | 1/1989 | Holzberger et al. | ........ | 415/208.3 |
| 4,829,885 A * | 5/1989 | McVicker | ...................... | 454/185 |
| 4,890,547 A * | 1/1990 | Wagner et al. | ................. | 454/356 |
| 5,209,286 A * | 5/1993 | Schmidt | .......................... | 165/45 |
| 5,267,897 A * | 12/1993 | Drees | ............................ | 454/225 |
| 5,292,280 A * | 3/1994 | Janu et al. | ....................... | 454/229 |
| 5,336,131 A * | 8/1994 | Crider et al. | ................... | 454/238 |
| 5,620,368 A * | 4/1997 | Bates et al. | .................... | 454/186 |
| 5,666,905 A * | 9/1997 | Mackin et al. | .................. | 119/448 |
| 5,699,284 A * | 12/1997 | Muramatsu | ...................... | 703/1 |
| 6,030,286 A * | 2/2000 | Kameoka et al. | ............. | 454/121 |
| 6,248,146 B1 * | 6/2001 | Willke, Jr. | ........................ | 55/338 |
| 7,209,873 B1 * | 4/2007 | Kliegel | ............................. | 703/9 |
| 7,497,774 B2 * | 3/2009 | Stevenson et al. | ............ | 454/354 |
| 7,555,413 B2 * | 6/2009 | Inagaki | ............................. | 703/2 |
| 7,630,198 B2 * | 12/2009 | Doll | ........................... | 361/679.49 |
| 8,635,974 B2 * | 1/2014 | Lemmon et al. | .............. | 119/448 |
| 2007/0178823 A1 * | 8/2007 | Aronstam et al. | ............. | 454/256 |
| 2012/0303339 A1 * | 11/2012 | Cruz | .................................. | 703/2 |
| 2012/0306318 A1 * | 12/2012 | Chase et al. | .................. | 310/339 |
| 2013/0317794 A1 * | 11/2013 | Chen et al. | ........................ | 703/2 |

OTHER PUBLICATIONS

Zhang, Zhao, "Modeling of Airflow and Contaminant Transport in Enclosed Environments", Dec. 2007, Purdue University, 2008, ProQuest Information and Learning Company.*
Sapounas et al., "Simulating the Effect of Forced Pit Ventilation on Ammonia Emission From a Naturally Ventilated Cow House With CFD", 2009, European Conference on Precision Livestock Farming; Precision livestock farming 09 4th, 81-90; Precision livestWageningen UR, Plant Science Group, The Netherlands.*

(Continued)

*Primary Examiner* — Gregory Huson
*Assistant Examiner* — Dana Tighe
(74) *Attorney, Agent, or Firm* — Rathe Lindenbaum LLP

(57) ABSTRACT

A livestock building design includes fans configured to provide an interior of the livestock building with a dissipation capacity of between 50 and 250.

7 Claims, 2 Drawing Sheets

(56) References Cited

OTHER PUBLICATIONS

Brochure entitled "Ventilation Objectives. Building Solutions", DDI, Inc. (Feb. 2010).

John Brian Priest, "Airflow Analysis in Mechanically Ventilated Obstructed Rooms", UMI Dissertation Services, excerpts—pp. iii-iv, ix-xii, 1-2, 113-122, 127-138 (2000).

* cited by examiner

LIVESTOCK BUILDING DESIGN

BACKGROUND

Livestock production depends upon the ability of the livestock to chemically convert feed or nutrients into products such as meat, eggs and milk. Such livestock production is highly dependent upon the ability of the livestock to dissipate body heat produced by such chemical activity to the surrounding environment. Because existing livestock building designs lack any meaningful similitude for convective heat release, it is difficult to optimize environmental conditions for different building configurations to maximize livestock production.

DETAILED DESCRIPTION OF THE EXAMPLE EMBODIMENTS

Figure 1:
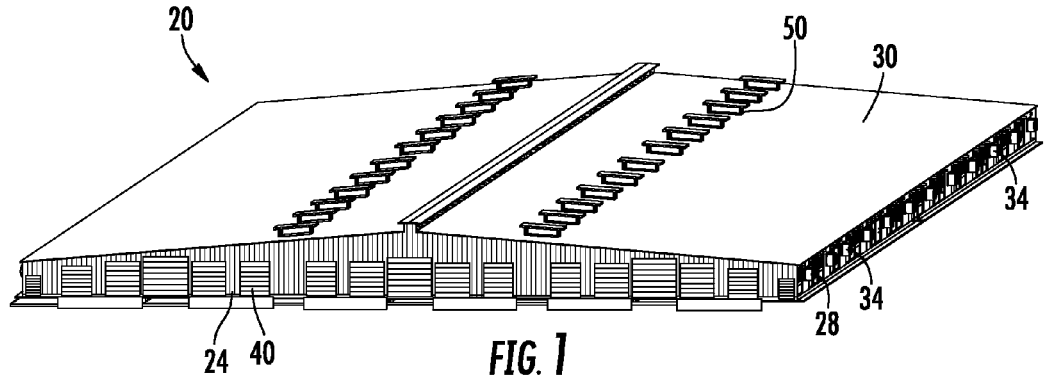
FIG. 1 is a top perspective of a livestock building according to an example embodiment.
Figure 2:
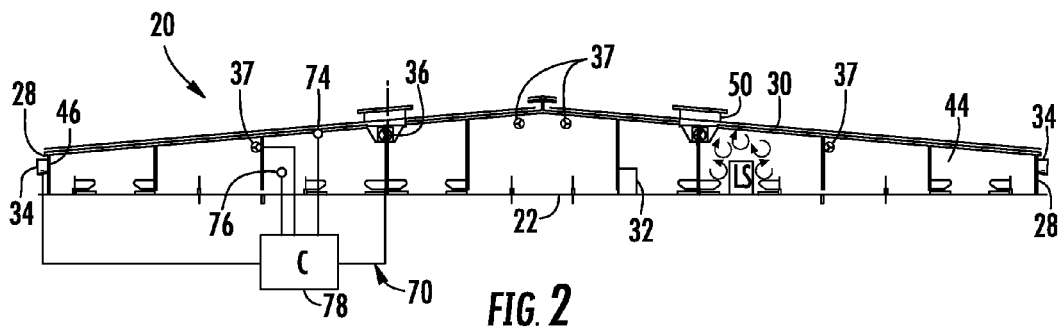
FIG. 2 is a sectional view of the livestock building a FIG. 1.

FIGS. 1 and 2 illustrate an example livestock building 20, a positive pressure building, designed or configured to more efficiently dissipate body heat produced by livestock to enhance livestock production. As will be described hereafter, livestock building 20 is designed to provide optimal environmental conditions for livestock production according to a methodology which provides building design similitude, wherein other buildings having different configurations may be provided with substantially duplicate optimal environmental conditions. Through similitude, this method provides enhanced flexibility and optimization of the turbulent environment, while maintaining customization in the design of livestock buildings in different locations and other unique building criteria.

As shown by FIGS. 1 and 2, livestock building 20 comprises floor 22, front walls 24, rear walls (not shown), side walls 28, roof or ceiling 30, livestock equipment 32, supply fans 34, ceiling supply fans 36 and mixing fans 37. Floor 22 serves as a foundation or bottom of building 20. Front walls 24 and the rear walls extend upwardly from floor 22. In the example illustrated, at least not lost 24 include one or more doors 40 through which livestock may enter and exit an interior 44 of building 20.

Side walls 28 extend upwardly from floor 22. Side walls 28 include openings 46 in which supply fans 34 are supported and through which air is blown into interior 44. Ceiling 30 extends across or over and above the floor 22. Ceiling 30 includes openings 50 in which ceiling supply fans 36 are supported and through which air is blown into interior 44.

Livestock equipment 32 comprises one or more structures within interior 44 which are configured to manage, separate, feed or receive production from livestock. In the example illustrated in which building 20 is configured to house cattle, such as beef cattle or dairy cattle, livestock equipment 32 comprises stanchion dividers. Other examples of livestock equipment include, but are not limited to, livestock feeding containers, livestock watering devices, milking equipment, egg laying boxes and the like. Although livestock building 20 is illustrated as being substantially rectangular, in other embodiments, livestock building 20 may have other shapes.

Supply fans 34 comprise one or more motor driven fan units supported or mounted in openings 46 and side walls 28 of building 20. Supply fans 34 each have an inlet side directly exposed to an exterior of livestock building 20 a discharge side directly exposed to the interior 44 livestock building 20. Supply fans 34 blow air outside of building 20 into the interior 44. Similar to supply fans 34, ceiling mounted supply fans 36 comprise motor driven fan units supported or mounted in the ceiling 30 of building 20. Ceiling mounted supply fans 34 each have an inlet side directly exposed to an exterior of livestock building 20 and a discharge side directly exposed to the interior 44 of livestock building 20. Ceiling mounted supply fans 36 blow air from outside the building 20 into interior 44.

Mixing fans 37 comprise one or more motor driven fan units supported or mounted so as to mix air within interior 44. Mixing fans 37 blow air from interior 44 back into interior 44. Mixing fans 37 each have an inlet side directly exposed to the interior of livestock building 20 and a discharge side also directly exposed to the interior 44 of livestock building 20.

Figure 3:
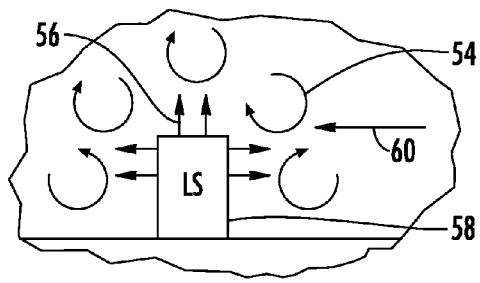
FIG. 3 is an enlarged fragmentary view of the livestock building of FIG. 2.

As shown by FIG. 3, supply fans 34 and 36 and mixing fans 37 create room air flows within interior 44 which results in turbulent airflow 54. The air flow is quantified into kinetic energy. Kinetic energy represents mean air flow motion that is converted into turbulence energy and then ultimately converted into heat by the viscous dissipation. Before viscous dissipation occurs the turbulent airflow 54 is productive as it dissipates heat 56 from livestock 58 through convective cooling. The dissipation capacity (DC) of turbulent airflow 54, also known as dissipation turbulence or dissipation velocity, is calculated from the kinetic energy density within interior 44. This density of turbulent airflow is a function of the kinetic energy of turbulent airflow within interior 44. Supply fans 34 and 36 and mixing fans 37 are collectively configured with appropriate size, velocity or power and number so as to provide interior 44 with a dissipation capacity of between 50 and 250. The dissipation capacity of building 20 is determined as follows:

$$DC = 200(\Sigma MF + \Sigma SF)^{1/2}, \text{ where:}$$

SF for each supply fan = $(18.2\, P_{SF} Q^3_{SF})/(\Pi D^4_{SF} P_{int} V_{int})$;
MF for each mixing fan = $(18.2\, P_{MF} Q^3_{MF})/(\Pi D^4_{MF} P_{int} V_{int})$;
$P_{MF,SF}$ is the density of the air discharged through the fan (kg/m$^3$);
$Q_{MF,SF}$ is the flow rate of air through the fan (m$^3$/s);
$D_{MF,SF}$ is the diameter of the fan (m), and
$P_{int}$ is the density of the air in the interior of the livestock building (kg/m$^3$); and
$V_{int}$ is the volume of the interior of the livestock building (m$^3$).

As compared to laminar airflow 60 which is generally created by solely using fans that discharge air out of the building (fans that have an inlet side exposed to the interior of the livestock building a discharge side exposed to the exterior of the livestock building), turbulent airflow provides enhanced convective dissipation of heat 56 from livestock 58. Because the turbulent airflow 54 created by supply fans 34 and 36 and mixing fans 37 more effectively dissipates heat 56 from livestock 58, livestock production is enhanced. For example, livestock 58 are less dependent at removing body heat through panting and have increased appetites, which leads to greater production.

In the example illustrated, supply fans 34 and 36 and mixing fans 37 of livestock building 20 are collectively configured so as to provide a dissipation capacity of between 50 and 71 to break winter time stratification. Dissipation capacities between 50 and 71 during winter time ventilation rates mix the air from ceiling to floor and from end to end of the building 20 creating a uniform and controllable environment for profitable production. During summer ventilation conditions, dissipation capacities exceed what is needed in the winter to break stratification and dissipation is needed to increase the heat release from the livestock through dissipation capacities between 125 and 250.

Because livestock building 20 is defined or characterized by the dissipation capacity, different buildings having different sizes, different fans and different outside environments may all be provided with optimal environmental conditions for livestock production. The use of dissipation capacity allows different buildings with different fans and different outside environments to be directly compared to one another and to allow for the creation or design of similar turbulence densities across all such different buildings. In other words, the use of dissipation capacity provides the benefit of similitude.

Because each of such different buildings is provided with a dissipation capacity of between 50 and 250, each of such different buildings offers enhanced heat dissipation for livestock 58 (cattle, poultry, swine, or other livestock) for enhanced livestock production. In the example illustrated, supply fans 34 and 36 of livestock building 20 are collectively configured so as to provide a dissipation capacity of between 50 and 70 when an average air temperature in livestock building 20 is greater than an air temperature outside the livestock building, such as during winter, and so as to have a dissipation capacity of between 125 and 250 when the average air temperature inside livestock building 20 is above the desired set point for livestock 58 and heat dissipation is needed in livestock building 20, such as during the summer.

Dissipation capacities may vary amongst different livestock as well. For example, for dairy cattle, dissipation capacities between 50 and 175 may be beneficial. For a egg laying buildings, dissipation capacities between 50 and 250 may be beneficialSwine dissipation capacities will be between 50 and 200 with other ranges for other livestock types]

Figure 4:
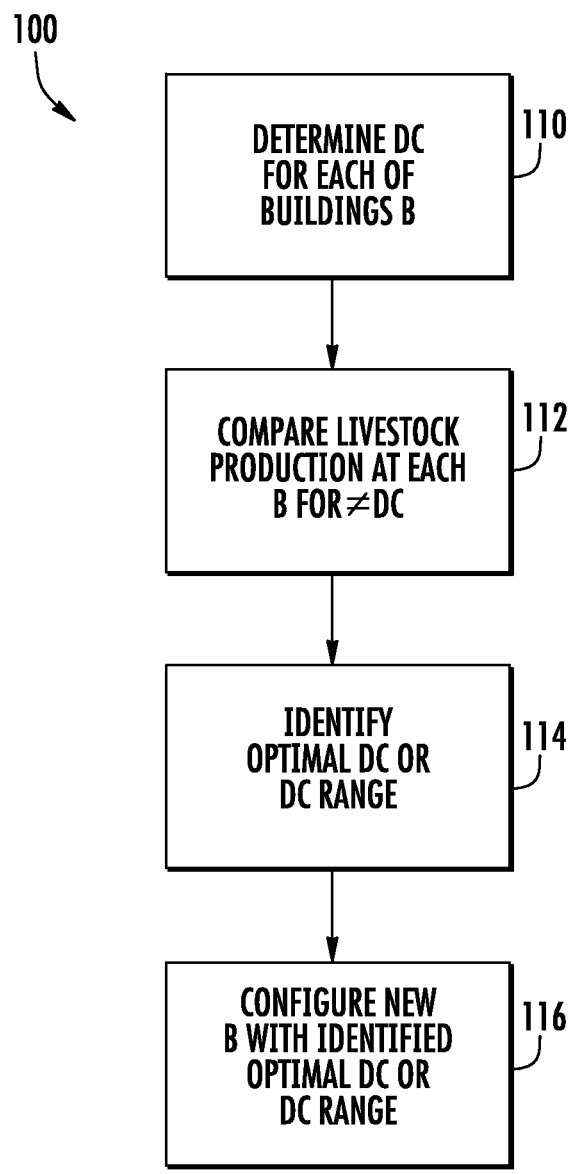
FIG. 4 is a flow diagram of a method for designing livestock buildings according to an example embodiment.

FIG. 4 is a flow diagram of a process or method 100 for configuring a livestock building for enhanced livestock production. As indicated by step 110, the dissipation capacity for each of a plurality of buildings B is determined. In particular, the dissipation capacity for each of the plurality buildings is determined using the above definition. In one embodiment, each of the plurality buildings are the same, wherein the fans are operated at different speeds. In another embodiment, the plurality of buildings are different, either in size or in fan configuration.

As indicated by step 112, the livestock production for a particular type of livestock in each of the buildings is determined and compared with the livestock production for the same type of livestock in the other buildings. The type of livestock is not only the species/breed of livestock, but the age and possibly gender of the livestock to facilitate comparison. In other embodiments, statistical analysis may be used to accommodate situations where the different buildings house livestock which are not identical to one another.

As indicated by step 114, based upon the comparison of livestock production in the different buildings with different dissipation capacities, the optimal dissipation capacity or optimal range for dissipation capacities is identified. Such optimal dissipation capacities may include different optimal dissipation capacities are dissipation capacity ranges for different environmental climates (winter, summer, fall, spring) or for different types of livestock.

As indicated by step 116, the identified optimal dissipation capacities or dissipation capacity ranges are then employed in the configuration of new livestock buildings. For example, method 100 may reveal that for dairy milk production, a building desirably has an optimal dissipation capacity range of between A and B. Using this optimal dissipation capacity range, different buildings having different fans and different dimensions may all be provided with a dissipation capacity falling within the optimal dissipation capacity range. Individual studies for individual building dimensions and individual building configurations are no longer needed for optimal ventilation characteristics to provide optimal livestock production.

As further shown by FIG. 2, livestock building 20 additionally comprises laminar control system 70. Laminar control system 70 comprises temperature sensors 74, 76, fans 37 and controller 78. Temperature sensors 74, 76 comprise sensors configured to detect temperature which are located at various different heights at different locations within interior 44. In the example illustrated, control system 70 includes two sensors: sensor 74 near ceiling 30 and sensor 76 more proximal to floor 22. In other embodiments, control system 70 may include additional sensors at other vertical heights within interior 44. Sensors 74, 76 provide controller 78 with temperature readings at different heights within interior 44 such that controller 78 may determine different laminae or layers of heat within interior 44.

Fans 37 are described above. In the example illustrated fans 37 are adjustable, offering one of multiple available speeds or airflow throughput rates. In another embodiment, fans 37 are merely actuatable between on and off states. Control system 70 utilizes fans 37 to break up laminate of air within interior 44.

Controller 78 comprises one or more processing units configured to generate control signals directing the operation of fans 37 based upon sensed temperature data from temperature sensors 74, 76. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 78 may be embodied as part of one or more application-specific integrated circuits (ASICs). Unless otherwise specifically noted, the controller is not limited to any specific combination of hardware circuitry and software, nor to any particular source for the instructions executed by the processing unit.

Controller 78 controls the operation of fans 37 to mix and break up laminae of air at different temperatures for a more uniformity in heat, gases and particulates from floor 22 to ceiling 30. In one embodiment, controller 78 slightly turns particular fans 37 throughout building 20 on and off. In another embodiment, controller 78 generate control signals to adjust the flow rate or power setting of one or more of fans 37. In the embodiment illustrated, controller 78 controls the operation fans 37 to not only break up laminae of different heat zones, but to also achieve the desired dissipation turbulence. In some embodiments, laminar control system 70 may be omitted. In yet other embodiments, laminar control system 70 may be used in a building independent of achieving desired dissipation turbulence.

Figure 5:
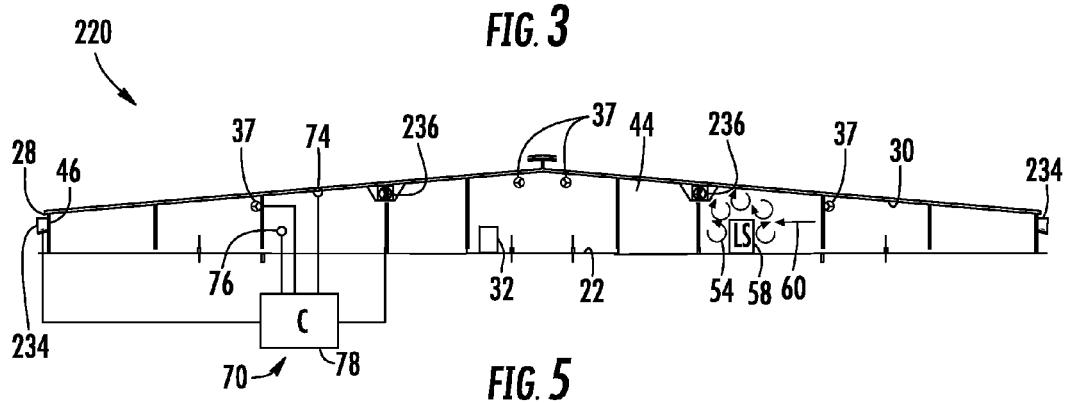
FIG. 5 is a sectional view of an example alternative embodiment of the livestock building of FIG. 2.

FIG. 5 illustrates livestock building 220, another embodiment of livestock building 20. In one embodiment, building 220 comprises a swine building. Like livestock building 20, livestock building to 20 is designed to provide optimal environmental conditions for livestock production by achieving a optimal three-dimensional or multidimensional airflow density, dissipation turbulence. Unlike livestock building 20, livestock building 220 achieves a desired dissipation turbulence using discharge fans 234 and mixing fans 236 in place of fans 34 and 36, respectively. Livestock building 220 also includes mixing fans 37 described above. Those remaining elements of livestock building 220 which correspond to elements of livestock building 20 are numbered similarly.

Each of discharge fans 234 comprises one or more motor driven fan units supported or mounted in openings 46 and side walls 28 of building 220. Discharge fans 234 each have an inlet side directly exposed to the interior 44 of livestock building 220 and a discharge side directly exposed to the exterior livestock building 220. Discharge fans 234 blow air from interior 44 through opening 46 to the exterior of building 220. As a result, building 220 comprises a negative pressure ventilation system or negative pressure building.

Mixing fans 236 comprise motor driven fan units supported by ceiling 30 of building 220. Ceiling mounted mixing fans 236 each have an inlet side directly exposed to an interior 44 of livestock building 220 a discharge side directly exposed to the interior 44 livestock building 20. Unlike ceiling fans 36 and similar to mixing fans 37, mixing fans 236 do not draw air from outside of the building, but merely mix existing air within the interior 44 of building 220 increasing the kinetic energy density resulting in greater dissipation capacities.

Discharge fans 234 and mixing fans 236, 37 are collectively configured with appropriate size, velocity or power and number so as to provide interior 44 with a dissipation capacity of between 50 and 250. The dissipation capacity of building 220 is determined as follows:

$DC = 200(\Sigma DF + \Sigma MF)^{1/2}$, where:

DF is the inlet energy created by the discharge fans= $(P_0 Q_0 V_0^2)/(P_{int} V_{int})$;

MF for each mixing fan= $(18.2 \; P_{MF} Q^3 mF)/(\Pi D^4_{MF} P_{int} V_{int})$;

$Q_0$ is the discharge flow rate at the inlet opening(s) of the interior (m³/s);

$V_0$ is the average discharge velocity at the inlet opening(s) of the interior (m/s);

$P_{MF}$ is the density of the air drawn through the mixing fan (kg/m³);

Po is the density of the air discharged through the inlet (kg/m³);

$Q_{MF}$ is the flow rate of air through the mixing fan (m³/s);

$D_{MF}$ is the diameter of the mixing fan (m); and $P_{int}$ is the density of the air in the interior of the livestock building (kg/m³).

As compared to laminar airflow 60 which is generally created by solely using fans that discharge air out of the building (fans that have an inlet side exposed to the interior of the livestock building a discharge side exposed to the exterior of the livestock building), turbulent airflow provides enhanced dissipation of heat 56 from livestock 58. Because the turbulent airflow 54 created by supply fans 34 and 36 more effectively convectively dissipates heat 56 from livestock 58, livestock production is enhanced. For example, livestock 58 expend less energy getting rid of body heat through panting and the like and have an increased appetite, which leads to greater production.

In the example illustrated, discharge fans 234 and mixing fans 236, 37 of livestock building 220 are collectively configured so as to provide a dissipation capacity of between 50 and 71 and average air temperature inside building 20 is greater than the air temperature outside the livestock building, such as during winter, and so as to have a dissipation capacity of between 125 and 250 when the average air temperature inside livestock building 220 is less than the air temperature outside of livestock building 220, such as during the summer.

Because livestock building 220 is defined or characterized by the dissipation capacity, different buildings having different sizes, different fans and different outside environments may all be provided with optimal environmental conditions for livestock production. The use of dissipation capacity allows different buildings with different fans (discharge and mixing fans) and different outside environments to be directly compared to one another and to allow for the creation or design of similar turbulence densities across all such different buildings. In other words, the use of dissipation capacity provides the benefit of similitude.

Because each of such different buildings is provided with a dissipation capacity of between 50 and 250, each of such different buildings offers enhanced heat dissipation for livestock 58 (cattle, poultry, swine, or other livestock) for enhanced livestock production. In the example illustrated, supply fans 234 and 236 of livestock building 220 are collectively configured so as to provide a dissipation capacity of between 50 and 70 when an average air temperature in livestock building 220 is greater than an air temperature outside the livestock building, such as during winter, and so as to have a dissipation capacity of between 125 and 250 when the average air temperature inside livestock building 220 is less than the air temperature outside of livestock building 220, such as during the summer.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising:
   determining a kinetic energy density of turbulent airflow within a livestock building, the kinetic energy based on a density of air within the livestock building and a volume of an interior of the livestock building;
   providing supply fans in the livestock building that are configured to blow air into the interior of the livestock building;
   supplying mixing fans in the livestock building; and
   operating each of a determined number of the supply fans and the mixing fans at a determined operational setting, comprising velocity and power, so as to provide the interior of the livestock building with a dissipation capacity based on the determined kinetic energy density of turbulent airflow within the livestock building, the dissipation capacity based upon density of air to be discharged through the supply fans and the mixing fans, a flow rate of air through each of the supply fans and the mixing fans and a diameter of each of the supply fans and the mixing fans.

2. The method of claim 1, wherein the determined number of the supply fans and the mixing fans and the operational setting of each of the supply fans and mixing fans is operated so as to provide the interior of the building with a first dissipation capacity when an average air temperature in the livestock building is greater than in air temperature outside the livestock building and is operated so as to provide the interior of the building with a second dissipation capacity greater than the first dissipation capacity when the average air temperature inside the livestock building is less than air temperature outside the livestock building.

3. The method of claim 1, wherein the fans have an inlet side directly exposed to an exterior of the livestock building and a discharge side directly exposed to the interior of the livestock building.

4. A method comprising:

determining a kinetic energy density of turbulent airflow within a livestock building, the kinetic energy based on a density of air within the livestock building and a volume of an interior of the livestock building;

providing discharge fans in the livestock building that are configured to blow air out of the livestock building;

providing mixing fans in the livestock building; and operating each of a determined number of the discharge fans and the mixing fans at a determined operational setting, comprising velocity and power, so as to provide the interior of the livestock building with a dissipation capacity based on the determined kinetic energy density of turbulent airflow within the livestock building, the dissipation capacity based upon density of air to be discharged through the discharge fans and the mixing fans, a flow rate of air through each of the discharge fans and the mixing fans and a diameter of each of the discharge fans and the mixing fans.

5. An apparatus comprising:

a livestock building having an interior with a kinetic energy density of turbulent airflow based on a density of air within the livestock building and a volume of the interior of the livestock building;

supply fans configured to blow air into the interior of the livestock building;

mixing fans to mix air within the livestock building, wherein a number of the supply fans and a number of the mixing fans operate at velocities and powers so as to provide the interior of the livestock building with a dissipation capacity based on a determined kinetic energy density of turbulent airflow within the livestock building, the dissipation capacity based upon density of air to be discharged through the supply fans and the mixing fans, a flow rate of air through each of the supply fans and the mixing fans and a diameter of each of the supply fans and the mixing fans.

6. The apparatus of claim 5, wherein the number of the supply fans and the number of the mixing fans are operated so as to provide the interior of the livestock building with a first dissipation capacity when an average air temperature in the livestock building is greater than in air temperature outside the livestock building and are operated so as to provide the interior of the building with a second dissipation capacity greater than the first dissipation capacity when the average air temperature inside the livestock building is less than air temperature outside the livestock building.

7. The apparatus of claim 5, wherein the fans have an inlet side directly exposed to an exterior of the livestock building and a discharge side directly exposed to the interior of the livestock building.

* * * * *